3,384,803
COMBINED AC AND DC POWER SUPPLY WITH TRANSFORMER TAP CHANGING REGULATION

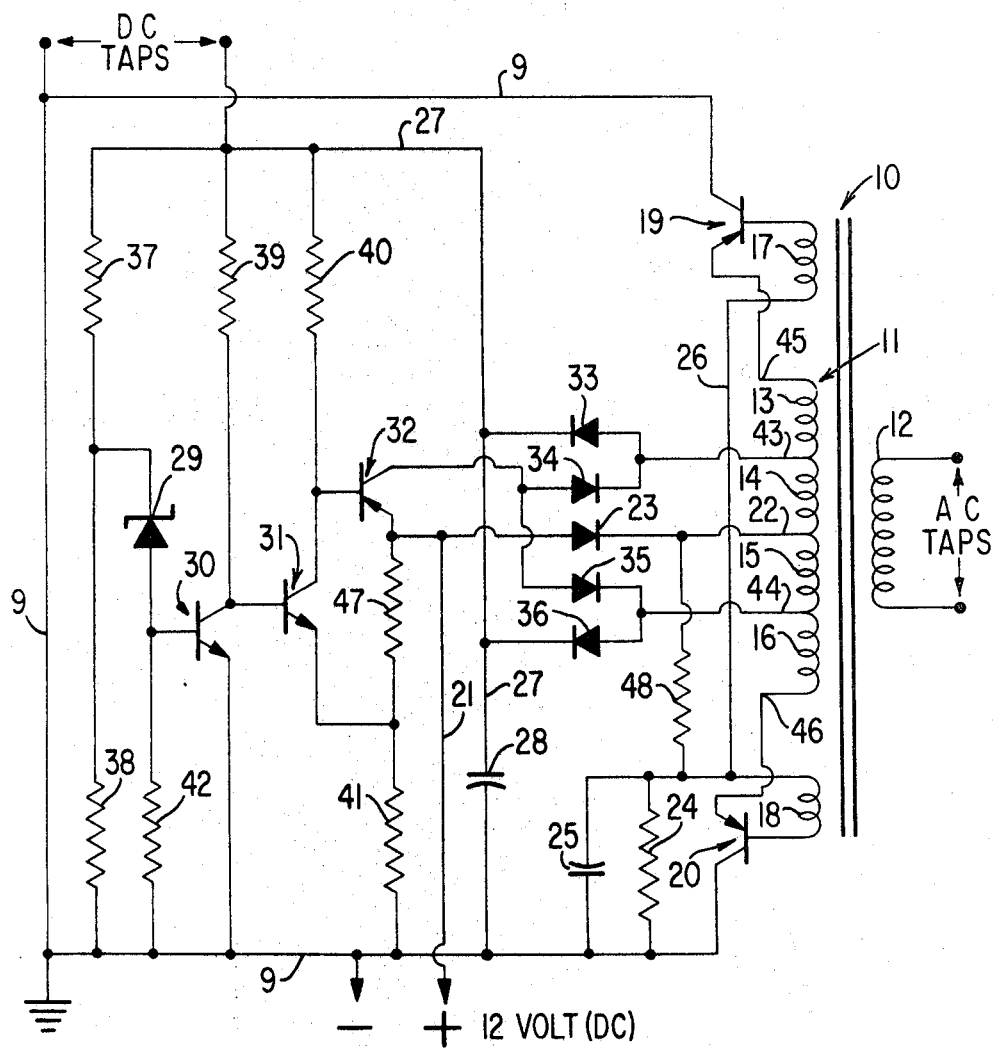

James T. Hardin and Rodger T. Lovrenich, Lambertville, Mich., assignors to Eltra Corporation, Toledo, Ohio, a corporation of New York
Filed Oct. 15, 1965, Ser. No. 496,463
9 Claims. (Cl. 321—2)

ABSTRACT OF THE DISCLOSURE

A voltage inverter for supplying a regulated AC and DC voltage from a low voltage DC power supply. A two-transistor, push-pull oscillator circuit is connected to the end of the primary winding of a power transformer. Two intermediate taps on the primary winding are connected to a full wave bridge rectifier. The outputs of the bridge rectifier are connected to the collector and base of a normally non-conducting control transistor. The emitter of the control transistor is operatively connected to the oscillator, thus forming a normally open circuit between each of the intermediate taps and the oscillator circuit. A transistor switching circuit is operatively connected to the base of the control transistor for rendering the control transistor conductive when the bridge rectifier output voltage is above or below predetermined values, thus shifting the apparent primary center tap during each half cycle of the oscillator.

---

This invention relates to a direct current voltage regulator which further includes a voltage inverter circuit for supplying alternating current to a pair of output terminals while maintaining a constant direct current voltage of a predetermined value at a second pair of output terminals, regardless of the current drain or charge condition of the power source.

More specifically, this invention relates to a solid state circuit particularly adapted for use in mobile installations, such as automobiles, where the available power source is a storage battery which is subject to variation in charge condition, temperature and other environmental factors. The invention has particular utility in that it is capable of supplying, with a minimum of components, a regulated direct current output voltage of a predetermined value and a second regulated AC output voltage, said output voltages remaining constant throughout a wide range of fluctuation in the power supply voltage due to current drain or poor battery condition, etc.

The circuit has particular utility in automotive installation where severe temperature variations adversely affect the voltage available from the battery and where heavy current drain at low speeds, such as during cranking, drops the available voltage from the battery. Accordingly, it is an object of this invention to provide a solid state circuit which includes a source of alternating and a source of direct current at a predetermined value, the voltages of said sources being regulated at a constant level throughout a wide range of variations of the power supply voltage.

It is another object of this invention to provide a regulated voltage converter for converting a low voltage DC power supply to a relatively high voltage, AC output signal and for supplying a regulated DC voltage output signal of a predetermined value from the same low voltage power supply.

Other objects and advantages of this invention will be apparent from the following detailed description of a preferred embodiment thereof, reference being made to the accompanying drawing in which:

The single figure is a schematic circuit diagram of a preferred embodiment of this invention, showing a pair of outlet taps for the regulated direct current output voltage and the regulated alternating current output voltage and showing the power supply to be, for example, a 12 volt battery.

It is to be understood that the circuit of the instant invention has many applications where regulated DC and AC voltages are required from a low voltage DC source, such as a battery. By way of example only, the circuit of this invention may be used in an automotive ignition system where the relatively high voltage AC output is used to charge an energy storage device in a capacitor discharge type ignition system and where the regulated DC voltage may be used to bias oscillator transistors in other components of the ignition system.

Referring to the single figure, a power transformer generally designated by reference numeral 10, includes a tapped primary winding 11 and a secondary winding 12 which is directly connected to a pair of AC output taps. The primary winding 11 includes windings 13, 14, 15, and 16 and a pair of regenerative feedback windings 17 and 18. A pair of PNP type transistors 19 and 20 are connected across the low voltage power source with their collectors connected to a common or ground line 9 and their emitters connected to the positive battery terminals through a line 21 which is connected to a center tap 22 of the primary windings 13–16 through a diode 23. The transistors 19 and 20 are base connected through the feedback coils 17 and 18 respectively and are biased by a resistor 48 connected from the center tap to a resistor 24 and a capacitor 25 connected in parallel between the ground line 9 and feedback windings 17 and 18 which are joined by a connecting line 26. The transistors 19 and 20, with their respective coils and base bias resistor 24 form a push-pull oscillator as is apparent.

Alternate conduction by the transistors 19 and 20 induces a high voltage, alternating current in the secondary winding 12 of the power transformer 10. The ratio of the windings in the primary 11 to the secondary 12 is selected such that the voltage level of the output alternating current is appropriate for use as a power source, for instance, for charging an energy storage device in a capacitor discharge type ignition system. Selection of the windings ratio is, of course, determined by the desired voltage level of the AC output signal. The operation of the DC to AC converter thus far described is conventional.

One of the designated DC output taps is directly connected to the common or ground line 9 while the other is connected to a line 27 which is separated from the common or ground line 9 by a capacitor 28. A Zener diode 29, three transistors 30–32 and four diode rectifiers 33–36 are operably connected to the primary 11 of the power transformer 10 and comprise a voltage regulator which performs the dual function of insuring a constant value DC voltage available at the DC outlet taps and a constant value AC voltage available at the AC output taps, as will be subsequently explained. These constant voltages are provided regardless of the variations, within a given range, of available battery voltage, for instance, as between 10 and 4 volts, respectively. The Zener diode 29 is connected across lines 9 and 27 between two voltage dividing resistors 37 and 38. The Zener diode is connected so that it will conduct when the voltage between the lines 9 and 27 exceeds that desired to be supplied to the DC taps, for instance, 20 volts.

The transistors 30 and 31 are NPN type transistors connected across lines 9 and 27 through voltage dropping resistors 39, 40 and 41 in their emitter-collector circuits to provide proper DC bias. The base of the transistor 30 is directly connected to the Zener diode 29 and to the ground line 9 through another voltage dropping resistor 42. The collector of the transistor 30 is directly connected to the base of the transistor 31 and the collector of the transistor 31 is directly connected to the base of the transistor 32, a PNP type, and to the line 27 through the resistor 40.

In addition to the center tap 22 on the primary 11 of the power transformer 10, two intermediate taps, 43 and 44 are positioned on and form a part of the primary winding 11 whereby the voltage drop between the center tap 22 and each intermediate tap 43 and 44 is twice the voltage drop between the intermediate taps 43 and 44 and the ends of the primary winding, designated by reference numerals 45 and 46. For example, if the voltage at the center tap 22, with respect to ground (line 9), is +12 volts and, assuming no voltage drop across the emitter-collector circuits of the transistors 19 and 20, when the transistor 19 conducts, the voltage at the intermediate tap 43 will be +4 volts with respect to ground; the voltage at the intermediate tap 44 will be +20 volts with respect to ground, due to auto transformer action of the common core winding. Following this example, the number of primary turns between the center tap 22 and the intermediate taps 43 and 44 is twice the number of turns between the intermediate taps 43 and 44 and the ends of the primary windings 45 and 46. When the transistor 20 conducts, the voltages at the intermediate taps 43 and 44 will be +20 and +4 volts, respectively.

The diodes 23, 34 and 35 are directly connected to the center tap 22, the intermediate tap 43 and the intermediate tap 44, respectively. The other side of the diodes 34 and 35 are directly connected to the collector of the transistor 32 while the other side of the diode 23 is directly connected to the emitter of the transistor 32 and to the positive battery terminal through the line 21. The diodes 33 and 36 are biased oppositely to the diodes 23, 34 and 35 and have one side connected to the intermediate taps 34 and 44 respectively, and the other side directly connected to the line 27. Finally, the emitters of the transistors 31 and 32 are connected to a resistor 47.

Assuming that the battery is fully charged at 12 volts and that the push-pull oscillator including the transistors 19 and 20 is in the state when the transistor 19 is conducting, then current will flow in the oscillator loop from the battery, through the collector-emitter of the transistor 19, the primary windings 13 and 14 of the transformer 17 to the center tap 22, the diode 23 and to the battery. Using the previous example, the voltages, with respect to ground (line 9) appearing at the taps 43, center tap 22 and intermediate tap 44, are +4, +12 and +20, respectively.

The diodes 33, 34, 35 and 36 constitute a rectifier and the voltage at the cathode of the diode 36 (or at the top of the capacitor 28) is the algebraic sum of these voltage drops, or +20 volts. When the push-pull oscillator reverses, the polarities of the windings reverse and the +20 volts now appears at the anode of the diode 33. Thus, regardless of which transistor 19 or 20 is conducting, the voltage at the cathode of the diode 33 or the diode 36, and thus the voltage in line 27 and the DC outlet taps is a constant +20 volts. During this operation, the transistors 31 and 32 remain in a state of non-conduction while the transistor 30 is held in its conductive state by the voltage applied to its base from the Zener diode 29 which, as previously explained, conducts so long as the voltage across lines 9 and 27 exceeds a predetermined voltage, for instance, 20 volts.

The voltage regulation function of the above described circuit will compensate for low voltage, due to a weak battery condition, low temperature or during cranking, by effectively "shifting" the center tap on the transformer primary windings 13–16 so that the DC output of the bridge rectifier including diodes 33–36 will remain at a uniform selected value, such as +20 volts in the illustrative example. When the voltage output from the bridge rectifier (and thus the voltage across the Zener diode 29) falls, current through the Zener diode 29 decreases and will consequently decrease conduction through the transistor 30. The transistor 31 is so biased that it will conduct more heavily as conduction through the transistor 30 decreases; likewise the transistor 32, a PNP type, will conduct proportionally when the output from the transistor 31 is applied to its base. Thus, a low battery voltage will cause the transistor 32 to conduct battery current. The voltage drop across transistor 32 is therefore controlled by the amount of conduction through the Zener diode 29. As the Zener diode 29 conducts less current, the voltage drop across transistor 32 decreases. This provides a controlled voltage drop in series with the battery voltage so that 4 volts is provided to the intermediate tap 43 or 44 over a range of battery voltages from approximately 4 volts to 12 volts. For example, when the battery voltage is 8 volts, the transistor 32 conduts and battery current will flow through the emitter-collector circuit of the transistor 32 from the diode 34 or 35, depending upon which of the transistors 19 or 20 of the push-pull oscillator is conducting. During the conducting period of the transistor 19, for example, the voltage between the emitter and the collector of the transistor 32 will be about 4 volts and the voltage between the diode 34 or the intermediate tap 43 and the top end 45 of the primary winding 11 will be 4 volts and the voltage drop across the other taps will be the same as before; thus the voltage at the anode of the diode 36 is again +20 volts, the same as it was in the previous example when the battery voltage was a full 12 volts. When the transistor 32 conducts, it shifts the effective center tap on the transformer primary 11 from its previous position at 22 to the position of the intermediate tap 43 and it reduces the battery voltage applied to the intermediate tap to 4 volts. In a similar manner, when the transistor 20 is conducting, the effective center tap position is shifted from the previous position of the intermediate tap 43 to the intermediate tap 45 and a voltage of +20 volts appears at the anode of the diode 33. Because the effective voltage through the primary 11 of the power transformer 10 remains unchanged, due to the action of the Zener diode 29 and the transistors 30–32 in shifting the effective position of the center tap, the induced voltage in the secondary 12 and thus the voltage level available at the AC tap remains constant, regardless of variations in battery voltage. Thus the direct current voltage between lines 9 and 27 and at the DC output taps is monitored by the Zener diode 29 which, through its control of transistors 30–32, will keep this voltage from falling below a predetermined level, such as 20 volts. The Zener diode 29 is not effective to regulate the output voltage if the battery voltage is above or below a certain value, say 12 and 4 volts respectively. However, this problem is not considered significant because selection of different turns ratios between the taps 43, 22, 44 and the end of the primary windings 45 and 46 will permit regulation at any desired battery voltage should some different control range be desired.

It will be apparent that various modifications may be made to the preferred embodiment described within the theory of operation of the various component systems. Specifically, the substitution of PNP for NPN type transistors and the selection and choice of parameters for the various described components will be apparent to persons skilled in the art.

Various other modifications will be apparent to those skilled in the art and it is to be understood that such modifications can be made without departing from the scope of invention, as set forth in the accompanying claims.

We claim:

1. A voltage inverter and regulator circuit comprising, in combination, a power transformer having primary and secondary windings, a low voltage direct current power supply, an oscillator circuit including a pair of transistors operably connected to each end of said primary and to said power supply whereby alternate conduction by said transistors will induce an alternating current in the secondary of said power transformer, a first pair of terminals connected to said secondary for connection to an external component, a center tap and two intermediate taps on the primary of said transformer, a diode bridge rectifier operably connected to said center and intermediate taps, a control transistor having its emitter-collector circuit connected to said diode bridge rectifier, means operatively connected to said low voltage power supply and responsive to voltage variations therefrom for rendering said control transistor conductive when such supply voltage falls below a predetermined value whereby, when said control transistor is conductive, the apparent center tap is shifted at each half cycle of operation of said primary-connected transistors to one or the other of said intermediate taps and whereby the induced voltage in said secondary remains constant and the resulting direct current voltage from said diode bridge rectifier also remains constant.

2. The inverter and regulator circuit of claim 1 which further includes a second pair of terminals operably connected to said diode bridge whereby the regulated direct current voltage therefrom may be connected to an external component.

3. The inverter and regulator circuit of claim 1 wherein said voltage responsive means in a Zener diode, operably connected across said low voltage power supply, which will conduct and maintain a constant supply voltage when the voltage of said supply is above a predetermined value, and wherein said control transistor is a normally nonconducting transistor operably connected to said Zener diode and responsive thereto, whereby said control transistor will conduct when said Zener diode conduction decreases due to low voltage.

4. A voltage inverter and regulator circuit comprising, in combination, a power transformer having primary and secondary windings, a low voltage direct current power supply, a solid state push-pull oscillator circuit including a pair of transistors operably connected to said transformer primary and said power supply whereby alternate conduction by said transistors will induce an alternating current in said secondary of said transformer, a center tap and two intermediate taps on said transformer primary, means operably connecting said center tap to said oscillator transistors to complete a closed loop circuit for each of said transistors, a diode rectifier operatively connected to each of said intermediate taps whereby the output thereof is a direct current comprising the rectified output of both said oscillator transistors, means connecting the output of said rectifiers with said oscillator transistors including a normally nonconducting control transistor with its emitter-collector circuit connected between said rectifiers and said oscillator transistors, means operatively connected to the output of said rectifiers and responsive to voltage variations therein and operatively connected to the control electrode of said control transistor for changing its state of conduction when said rectifier output voltage is above or below predetermined values whereby, when said control transistor is conductive, the apparent center tap is shifted at each half cycle of said oscillator transistors to one or the other of said intermediate taps such that the increased current from said oscillator conductors is directed through a decreased number of turns in said transformer primary and whereby the induced voltage in said secondary and the resulting output voltage from said rectifiers remains substantially constant.

5. A voltage inverter and regulator comprising in combination, a power transformer having primary and secondary windings, a two transistor, push-pull oscillator operatively connected to a low voltage direct current power supply, a center tap and two intermediate taps on said primary, means connecting said oscillator transistors to the ends of said primary winding whereby alternate conduction by said transistors through a loop including a portion of said windings and said center tap will induce alternating current in said secondary winding, a normally open circuit connecting each of said intermediate taps to said oscillator circuit, said last named circuit including a full wave bridge rectifier circuit having inputs connected to intermediate taps and having outputs operatively connected between the collector and the control electrode of a normally nonconducting control transistor, said control transistor having its emitter operatively connected to said oscillator loop, voltage responsive means operatively connected to said power supply and responsive to voltage variations therefrom and operatively connected to the control electrode of said control transistor whereby said control transistor is rendered conductive when such voltage variations in said power supply fall below a predetermined value, whereby, when said control transistor is conductive the apparent center tap is shifted to one of said intermediate taps at each half cycle of operation by said oscillator transistors whereby the voltage applied to a portion of the primary is maintained substantially constant and whereby the induced voltage in said secondary and the rectified voltage and current from said intermediate taps remains at a substantially constant value.

6. The voltage inverter and regulator of claim 5 wherein said voltage responsive means is a Zener diode operatively connected to said power supply and conducting proportionally when such supply voltage is within the predetermined range.

7. The voltage inverter and regulator of claim 6 wherein the number of turns between said center tap and each of said intermediate taps is equal.

8. The voltage inverter and regulator of claim 5 wherein the output voltage available from said bridge rectifier circuit is greater than said supply voltage due to autotransformer action of said primary and further including a pair of output terminals operatively connected to said bridge rectifier circuit whereby said increased direct current voltage may be connected to an external component.

9. The voltage inverter and regulator of claim 5 wherein said power transformer is a voltage step-up transformer.

References Cited

UNITED STATES PATENTS

| | | | |
|---|---|---|---|
| 2,959,726 | 11/1960 | Jensen | 323—43.5 X |
| 3,119,056 | 1/1964 | Hatke et al. | 321—2 |
| 3,217,239 | 11/1965 | Lunney | 323—43.5 |
| 3,350,620 | 10/1967 | Barron | 321—2 |

JOHN F. COUCH, *Primary Examiner.*

WARREN E. RAY, *Examiner.*

W. H. BEHA, *Assistant Examiner.*